(12) United States Patent
Sahara et al.

(10) Patent No.: US 8,461,734 B2
(45) Date of Patent: Jun. 11, 2013

(54) ELECTRIC MOTOR HAVING A CIRCUIT APPARATUS

(75) Inventors: Yoshimichi Sahara, Toyohashi (JP); Masato Ooishi, Hamamatsu (JP); Tatsuya Kawai, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 454 days.

(21) Appl. No.: 12/801,072

(22) Filed: May 20, 2010

(65) Prior Publication Data

US 2010/0295394 A1 Nov. 25, 2010

(30) Foreign Application Priority Data

May 21, 2009 (JP) ................................ 2009-123071

(51) Int. Cl.
*H02K 11/00* (2006.01)
*H02K 21/00* (2006.01)

(52) U.S. Cl.
USPC ............................. 310/71; 310/194; 310/197

(58) Field of Classification Search
USPC .................... 310/71, 179, 194, 197
See application file for complete search history.

(56) References Cited

U.S. PATENT DOCUMENTS

| 6,300,697 | B1 | 10/2001 | Findeisen et al. |
| 6,472,783 | B1 | 10/2002 | Witthohn et al. |
| 2008/0116855 | A1* | 5/2008 | Augesky et al. ............... 320/166 |
| 2009/0140595 | A1* | 6/2009 | Naganawa et al. ........... 310/201 |

FOREIGN PATENT DOCUMENTS

JP 2005-143247 A 6/2005

* cited by examiner

*Primary Examiner* — Tran Nguyen
*Assistant Examiner* — Jose Gonzalez Quinones
(74) *Attorney, Agent, or Firm* — Posz Law Group, PLC

(57) ABSTRACT

Winding start sections and winding end sections of winding wires are pulled out from slots of an armature core and are guided by wire guides of an insulator. Thereafter, each corresponding one of the winding start sections and the winding end sections is guided by a corresponding winding holding portion and is directly connected to a corresponding one of power supply terminal elements of a circuit apparatus without using an intermediate terminal.

6 Claims, 20 Drawing Sheets

ELECTRIC MOTOR HAVING A CIRCUIT APPARATUS

CROSS REFERENCE TO RELATED APPLICATION

This application is based on and incorporates herein by reference Japanese Patent Application No. 2009-123071 filed on May 21, 2009.

BACKGROUND OF THE INVENTION

1. Field of the Invention

The present invention relates to an electric motor.

2. Description of Related Art

For instance, in a case of a brushless motor, a circuit apparatus is provided to supply an electric current to winding wires of multiple phases to energize the same. The circuit apparatus sequentially executes the energization of the winding wires of the multiple phases. Therefore, it is necessary to electrically connect between each of power supply terminal elements of the circuit apparatus and a corresponding one of the winding wires of the multiple phases. Japanese Unexamined Patent Publication No. 2001-527376 (corresponding to U.S. Pat. No. 6,472,783B) teaches a technique of integrating the circuit apparatus and the brushless motor. According to this technique, intermediate terminals are provided between the power supply terminal elements of the circuit apparatus and the winding wires to electrically connect between the power supply terminal elements of the circuit apparatus and the winding wires.

However, when the intermediate terminals are provided between the power supply terminal elements of the circuit apparatus and the winding wires, manufacturing costs are disadvantageously increased. Therefore, in order to reduce the manufacturing costs, there is a need for improvement.

SUMMARY OF THE INVENTION

The present invention is made in view of the above disadvantage. Thus, it is an objective of the present invention to provide an electric motor, which enables reduction or minimization of manufacturing costs of the electric motor.

To achieve the objective of the present invention, there is provided an electric motor, which includes an armature core, a plurality of winding wires, a plurality of wire guides, a plurality of wire holding portions and a circuit apparatus. The armature core includes an annular portion and a plurality of teeth. The annular portion is configured into an annular form. The teeth extend radially outward from the annular portion in a radial direction of the annular portion and are arranged one after another in a circumferential direction of the annular portion to define a plurality of slots, each of which is defined between corresponding circumferentially adjacent two of the teeth. Each of the winding wires is wound in a plurality of layers around each corresponding one of the teeth to form a coil around the corresponding tooth and is guided out from a corresponding one of the slots on one axial side of the armature core to form a winding terminal section of the winding wire, which is continuous with the coil of the winding wire. Each of the wire guides is provided at a radial bottom portion of a corresponding one of the slots and guides the winding terminal section of a corresponding one of the winding wires toward the one axial side of the armature core. Each of the wire holding portions is formed separately from the wire guides and is placed on the one axial side of the armature core at a corresponding location that is located on one axial side of a corresponding one of the wire guides, which is opposite from the armature core, and is generally aligned with the corresponding one of the wire guides along an axial direction of the armature core. Each of the wire holding portions holds the winding terminal section of the corresponding one of the winding wires guided by the corresponding one of the wire guides. The circuit apparatus is placed on the one axial side of the armature core and supplies an electric current to the winding wires. The circuit apparatus includes a plurality of power supply terminal elements, each of which is electrically connected to the winding terminal section of a corresponding one of the winding wires axially protruded out from a corresponding one of the wire holding portions on one axial side of the corresponding wire holding portion that is opposite from the armature core.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
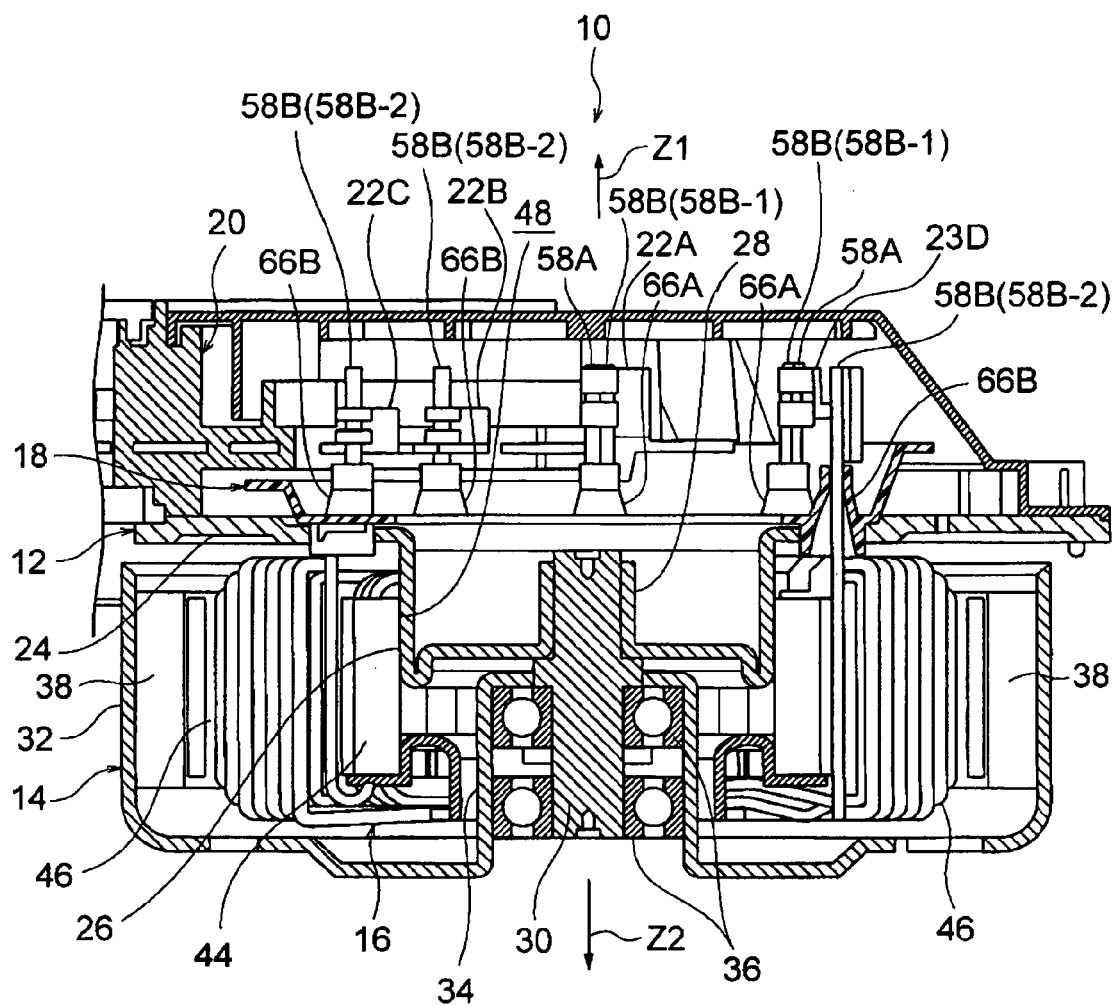
FIG. 1 is a cross-sectional view of an electric motor according to an embodiment of the present invention.

With reference to FIG. 1, an electric motor 10 of the present embodiment is used as, for example, an electric motor (fan motor) for driving a fan to cool a radiator of a vehicle (e.g., an automobile). The motor 10 includes a centerpiece (partition member) 12, a rotor 14, a stator 16, a holding member 18 and a circuit apparatus 20.

Figure 16:
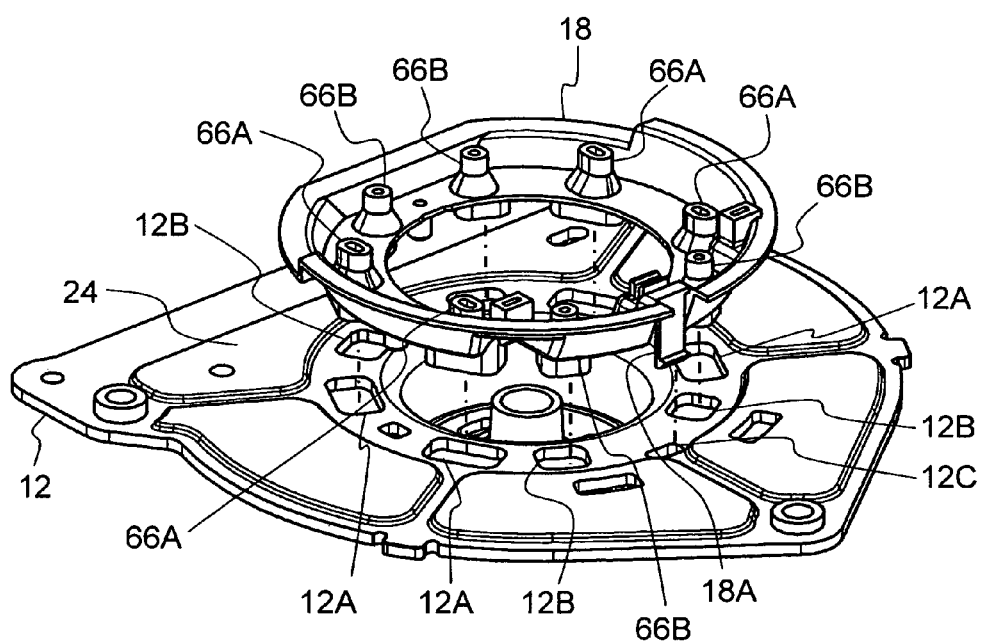
FIG. 16 is a perspective view showing a centerpiece and a holding member of the motor of FIG. 1.

The centerpiece 12 includes a main body 24, which is configured into a plate form (see FIG. 16). The main body 24 is placed on one axial side (Z1 side) of an armature core 44 of the stator 16 and has a shaft portion 26, which projects from a center of the main body 24 toward the other axial side (Z2 side). A tubular portion 28 is formed at a center of the shaft portion 26, and a motor shaft 30 is non-rotatably fixed to the tubular portion 28.

The rotor 14 includes a cup-shaped rotor housing 32. A tubular fixing portion 34 is formed at a center of a bottom portion of the rotor housing 32. Two bearings 36 are received in the fixing portion 34. The motor shaft 30 is fixed to the bearings 36, so that the rotor 14 is rotatably supported relative to the motor shaft 30. Furthermore, rotor magnets 38 are fixed to an inner peripheral surface of a cylindrical wall of the rotor housing 32. The rotor magnets 38 are magnetized in a radial direction of the armature core 44.

The stator 16 includes the armature core 44 and windings wires 46. The armature core 44 includes a laminated core (iron core) 44A and two electrical insulator segments 44B, 44C cooperating together to serve as an electrical insulator. The electrical insulator segments 44B, 44C are axially installed to the laminated core 44A from the axial sides Z1, Z2, respectively. The armature core 44 has a center hole 48, which axially penetrates through a center of the armature core 44. The shaft portion 26 is press fitted into the hole 48, so that the armature core 44 is supported by the shaft portion 26.

Figure 2:
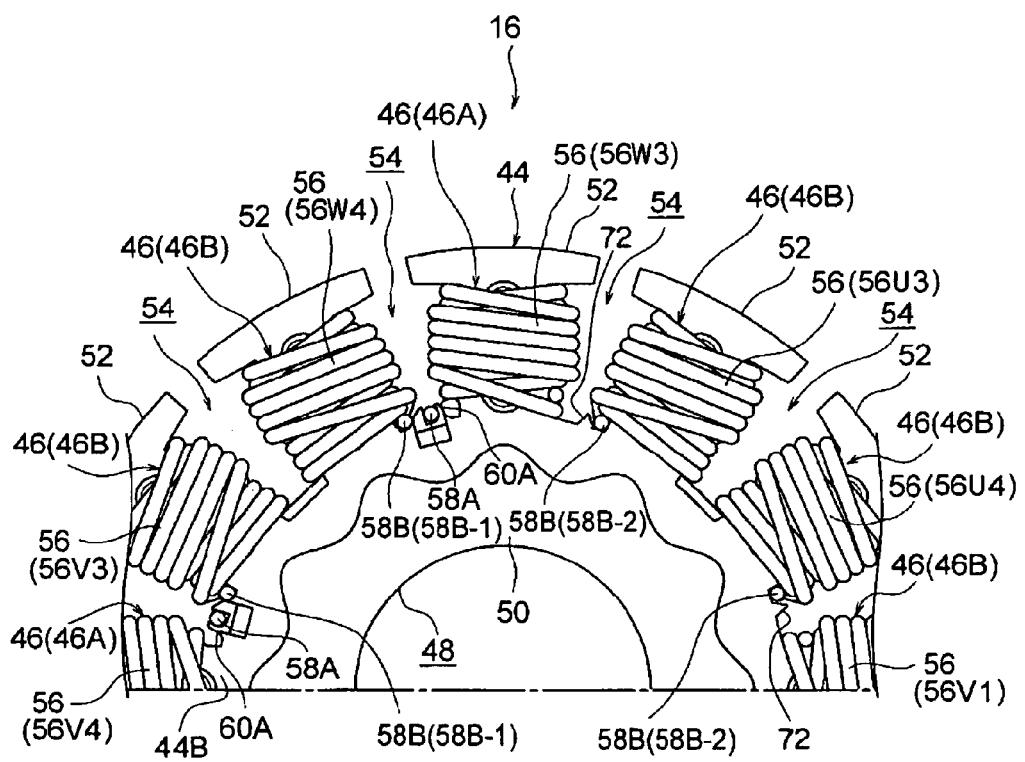
FIG. 2 is a partial plan view of a stator of the motor shown in FIG. 1.
Figure 3:
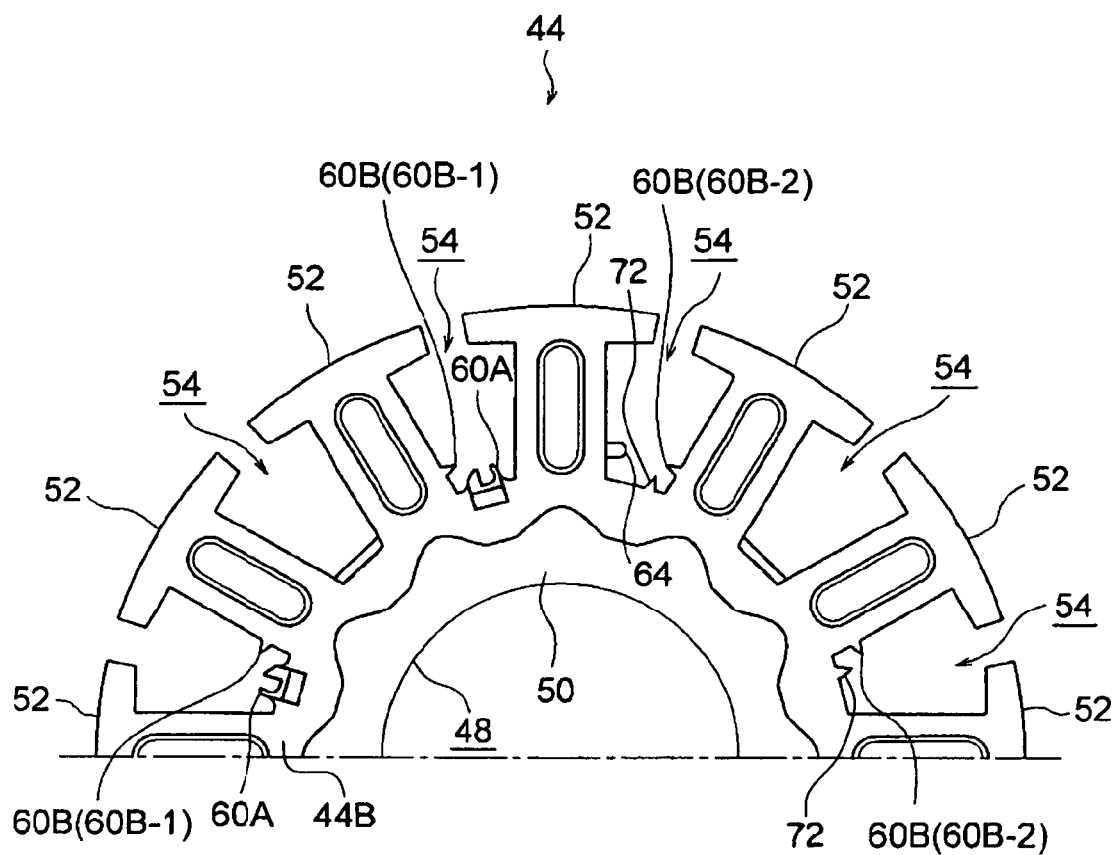
FIG. 3 is a partial plan view of an armature core of the motor of FIG. 2 taken from one axial side.

As shown in FIGS. 2 and 3, the armature core 44 includes an annular portion 50, which has the hole 48 discussed above and is configured into an annular form. A plurality of teeth 52 extends radially outward from the annular portion 50 such that the teeth 52 are arranged one after another in the circumferential direction. A slot 54 is formed between each circumferentially adjacent two of the teeth 52.

With reference to FIG. 2, there is provided a plurality of winding wires 46. The winding wires 46 are wound around the teeth 52 multiple times to form coils 56, each having a plurality of layers of the corresponding wire 46. Each winding wire 46 includes a winding wire segment (serving as a first winding wire segment) 46A and a winding wire segment (serving as a second winding wire segment) 46B.

Each winding wire segment 46A has a winding end section (serving as a winding terminal section) 58A, which is continuous with the corresponding coil 56 and is pulled out from the corresponding slot 54 on the one axial side Z1 of the armature core 44. Each winding wire segment 46B has a winding start section (serving as a terminal section) 58B, which is continuous with the corresponding coil 56 and is pulled out from the corresponding slot 54 on the one axial side Z1 of the armature core 44.

The winding end section 58A and the winding start section 58B (58B-1) are pulled out from the common slot 54. The winding start section 58B (58B-2) is solely pulled out from the corresponding slot 54.

These winding wires 46 form a U-phase, a V-phase and a W-phase. The arrangement of the U-phase, the V-phase and the W-phase and the arrangement of bridge line segments 59, each of which interconnects between corresponding two of the coils 56, are generally the same as those of the known ones. In this embodiment, the motor 10 is constructed as a brushless electric motor having ten poles and twelve slots.

Figure 4:
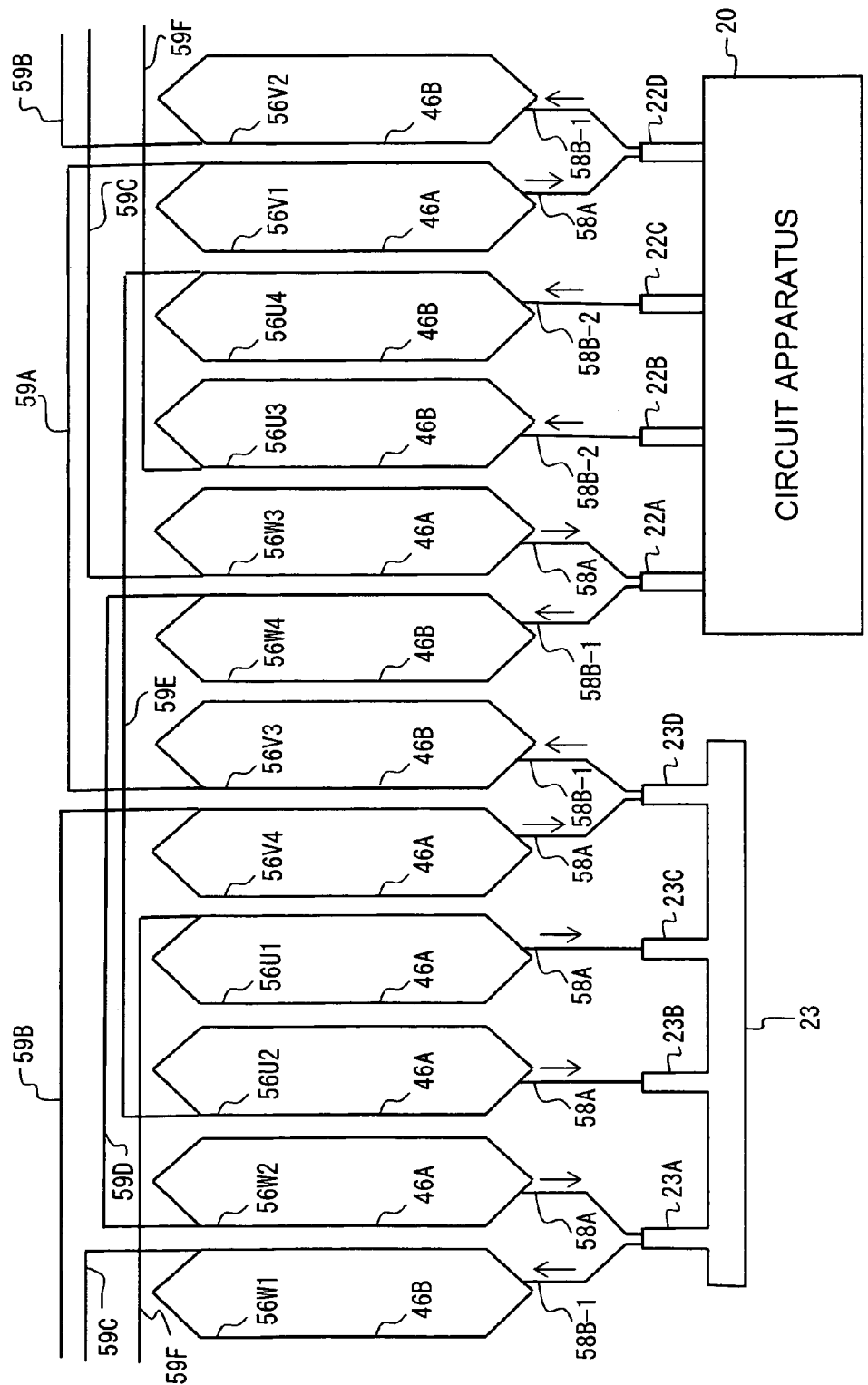
FIG. 4 is a winding diagram showing arrangement of winding wires of the motor of FIG. 1.

The winding wire segment 46A and the winding wire segment 46B of each winding wire 46 are connected with each other through the corresponding bridge line segment 59. The winding wire segment 46A is wound around the corresponding tooth 52 to form the corresponding coil 56, and the winding wire segment 46B is wound around the corresponding tooth 52 to form the corresponding coil 56. More specifically, with reference to FIG. 4, in the present embodiment, the coils 56 include twelve coils 56U1, 56U2, 56U3, 56U4, 56V1, 56V2, 56V3, 56V4, 56W1, 56W2, 56W3, 56W4. The coils 56U1, 56U2, 56U3, 56U4 are of the U-phase, and the coils 56V1, 56V2, 56V3; 56V4 are of the V-phase. Furthermore, the coils 56W1, 56W2, 56W3, 56W4 are of the W-phase. The bridge line segments 59 include six bridge line segments 59A, 59B, 59C, 59D, 59E, 59F. The coil 56U4, which is continuous with the corresponding winding start section 58B-2, is connected to the coil 56U2, which is continuous with the corresponding winding end section 58A, through the bridge line segment 59E. The coil 56U3, which is continuous with the corresponding winding start section 58B-2, is connected to the coil 56U1, which is continuous with the corresponding winding end section 58A, through the bridge line segment 59F. The coil 56V2, which is continuous with the corresponding winding start section 58B-1, is connected to the coil 56V4, which is continuous with the corresponding winding end section 58A, through the bridge line segment 59B. The coil 56V3, which is continuous with the corresponding winding start section 58B-1, is connected to the coil 56V1, which is continuous with the corresponding winding end section 58A, through the bridge line segment 59A. The coil 56W1, which is continuous with the corresponding winding start section 58B-1, is connected to the coil 56W3, which is continuous with the corresponding winding end section 58A, through the bridge line segment 59C. The coil 56W4, which is continuous with the corresponding winding start section 58B-1, is connected to the coil 56W2, which is continuous with the corresponding winding end section 58A, through the bridge line segment 59D. In the present embodiment, unless it is necessary to distinguish the individual coils 56U1, 56U2, 56U3, 56U4, 56V1, 56V2, 56V3, 56V4, 56W1, 56W2, 56W3, 56W4, they will be referred to as the coils 56. Similarly, unless it is necessary to distinguish the individual bridge line segments 59A, 59B, 59C, 59D, 59E, 59F, they will be referred to as the bridge line segments 59.

A plurality of wire guides 60A is formed in the insulator segment 44B. Each wire guide 60A is formed at a radially inner bottom portion of the corresponding slot 54, at which the corresponding winding end section 58A is placed. The wire guide 60A guides the winding end section 58A to the one axial side of the armature core 44. Furthermore, a plurality of wire guides 60B (see FIG. 3) is formed in the insulator segments 44B, 44C. Each wire guide 60B is formed at a radially inner bottom portion of the corresponding slot 54, at which the corresponding winding start section 58B is placed. The wire guide 60B guides the winding start section 58B to the one axial side of the armature core 44.

With reference to FIG. 3, the wire guides 60B include wire guides 60B-1, 60B-2. The wire guide 60B-1 guides the winding start section 58B-1 and is formed in the corresponding slot 54, at which the wire guide 60A is formed. In contrast, the wire guide 60B-2 guides the winding start section 58B-2 and is solely formed in the corresponding slot 54, at which the wire guide 60A is not formed. In the present embodiment, unless it is necessary to distinguish the individual wire guides 60B1, 60B-2, they will be referred to as the wire guides 60B.

Figure 7:
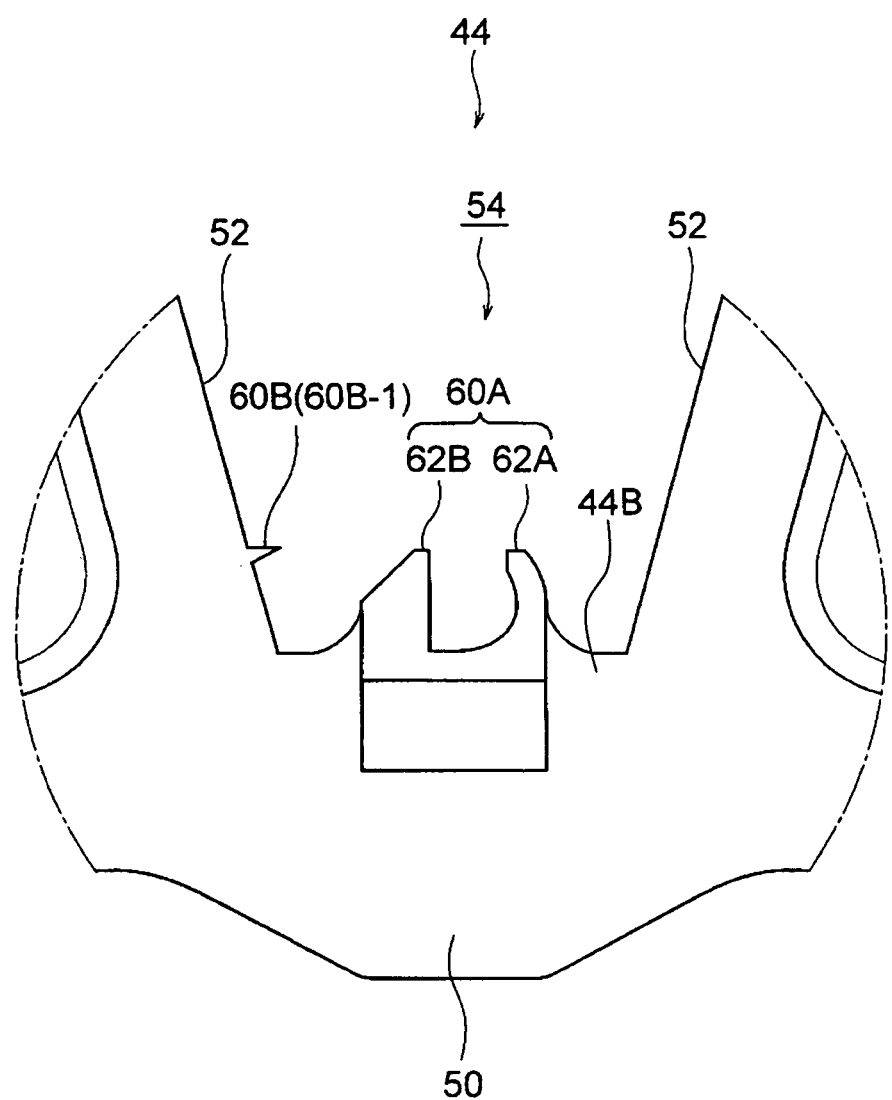
FIG. 7 is an enlarged partial view of the armature core of FIG. 3.
Figure 8:
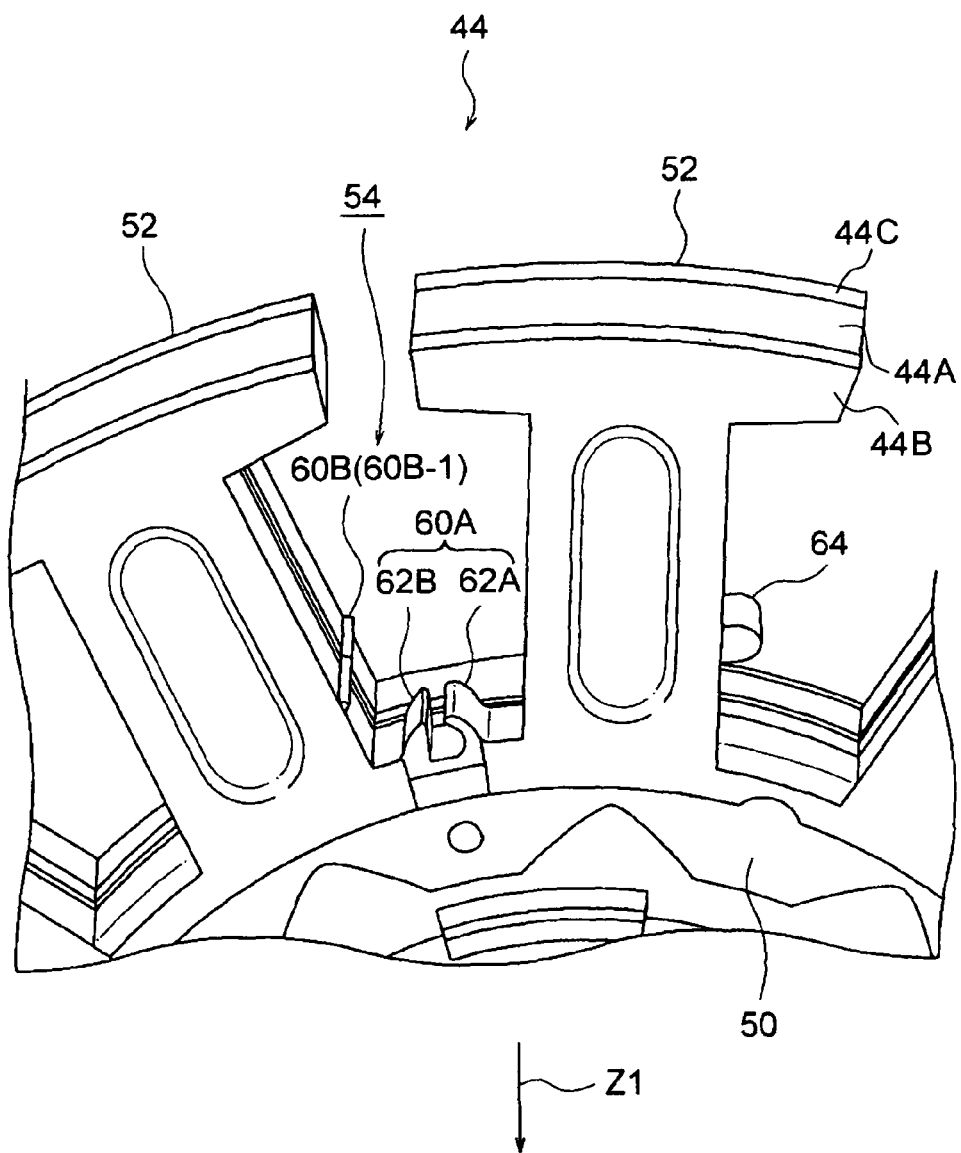
FIG. 8 is a partial perspective view of the armature core of the motor of FIG. 2 taken from the one axial side.
Figure 9:
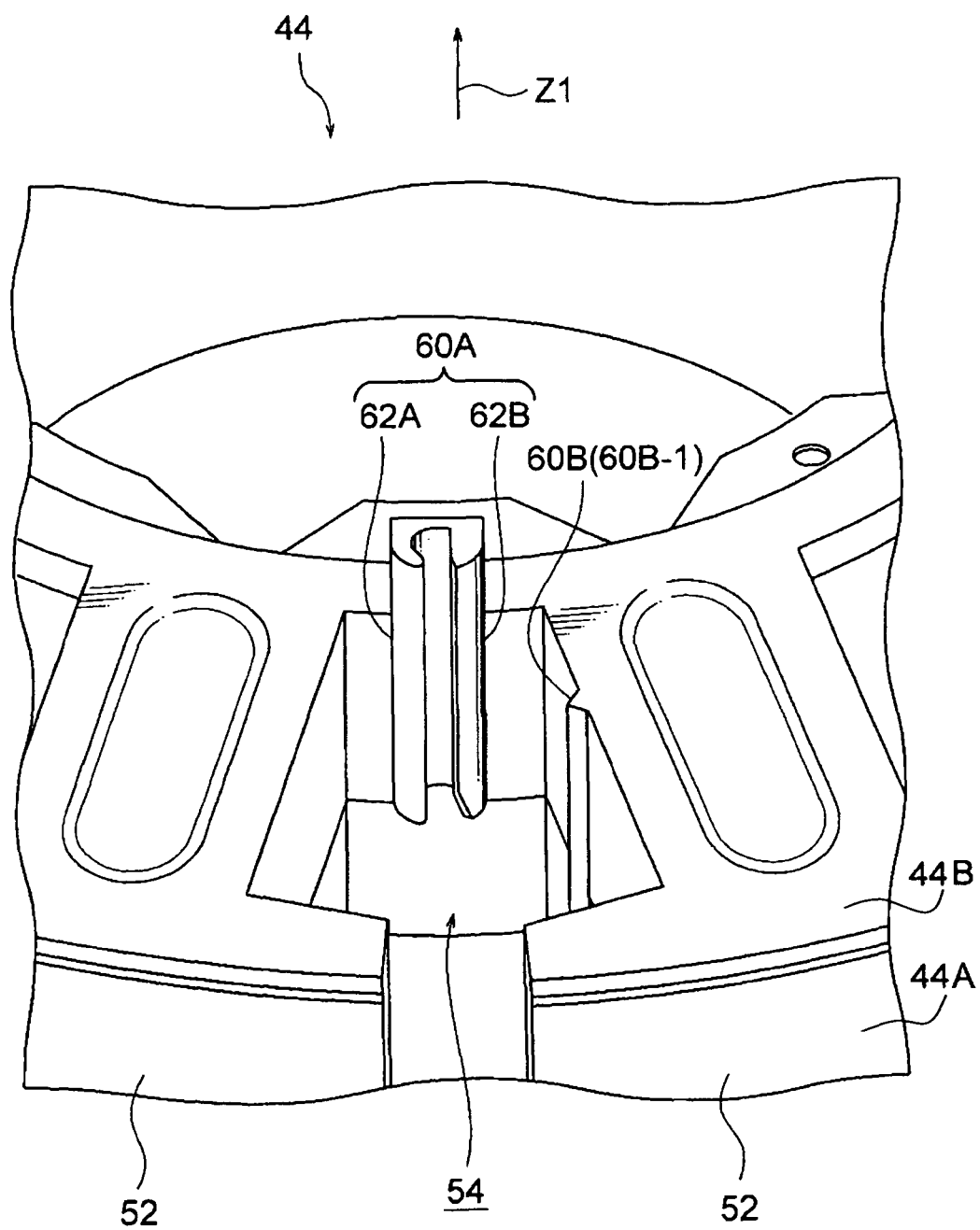
FIG. 9 is an enlarged partial perspective view of the armature core of FIG. 2 taken from a different angle, which is different from the angle of FIG. 8.

As shown in FIGS. 7 to 9, each wire guide 60A includes two clamping pieces 62A, 62B. The clamping piece 62A is formed as a resiliently deformable piece and is placed on an opposite circumferential side of the clamping piece 62B, which is opposite from the wire guide 60B (more specifically, the wire guide 60B-1) in the circumferential direction. The clamping piece 62A has a greater resiliency in comparison to the clamping piece 62B in the circumferential direction because of a circumferential wall thickness difference between the clamping piece 62A and the clamping piece 62B. The wire guide 60B is formed as a projection, which projects circumferentially and axially extends in the axial direction of the armature core 44.

Figure 10:
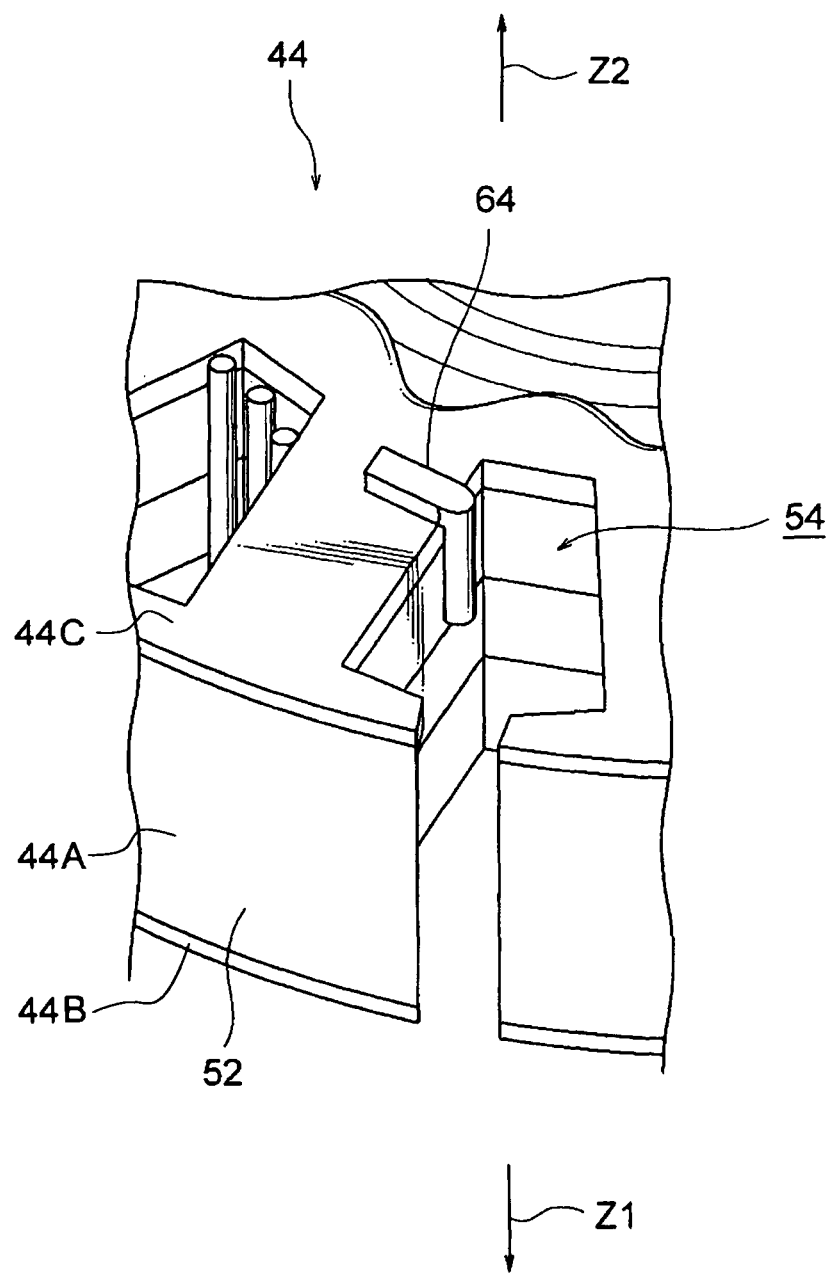
FIG. 10 is an enlarged partial perspective view of the armature core of FIG. 2 taken from the other axial side.
Figure 11:
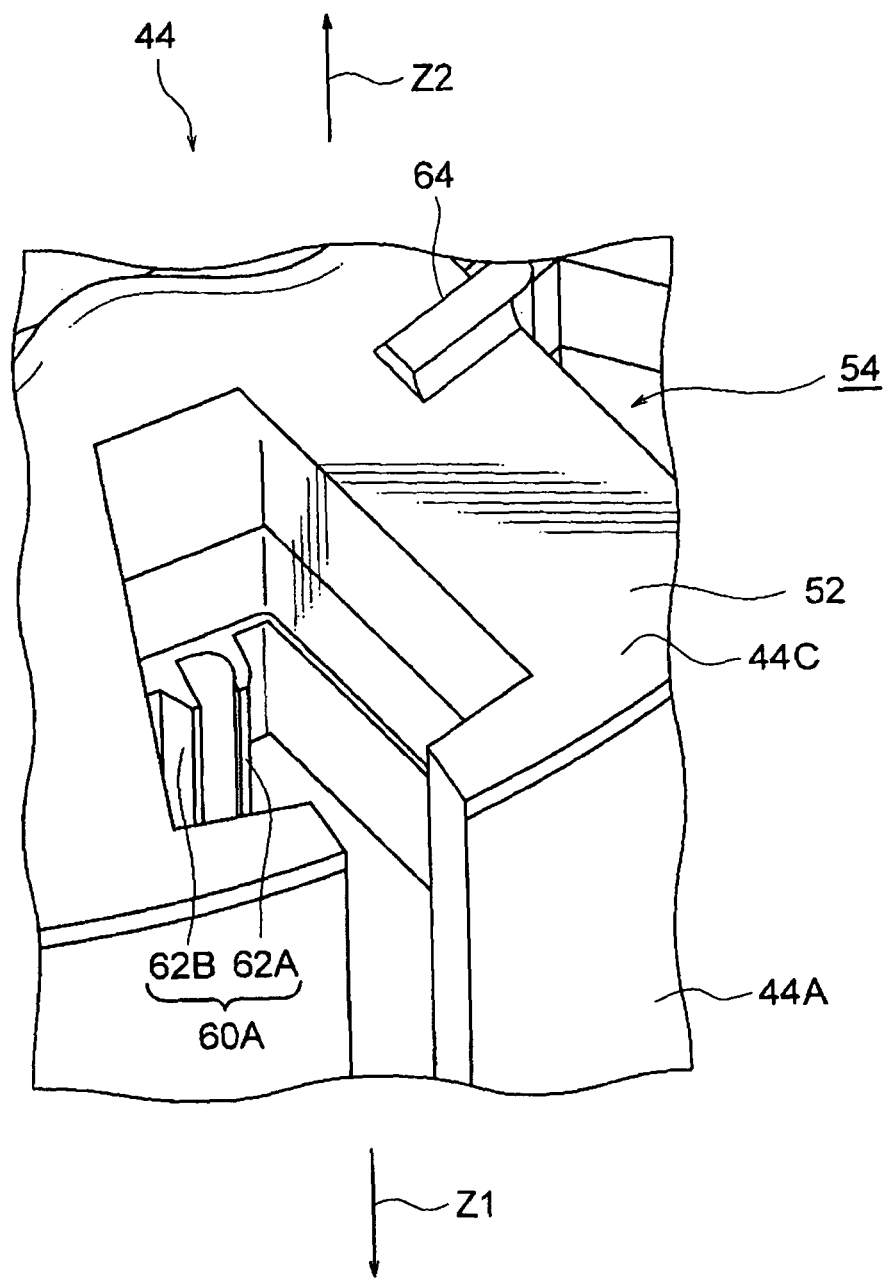
FIG. 11 is an enlarged partial perspective view of the armature core of FIG. 2 taken from a different angle, which is different from the angle of FIG. 10, on the other axial side.

As shown in FIGS. 10 and 11, a wire limiter 64 is formed in the insulator segment 44C at the corresponding tooth 52 (see FIG. 2), around which the winding wire segment 46A having the winding end section 58A is wound. The wire limiter 64 is formed at a radial location, which is radially outwardly spaced from the radially inner bottom portion of the slot 54, and circumferentially projects from the tooth 52. The wire limiter 64 is located at the opposite axial side Z2 part of the armature core 44, which is opposite from the wire guide 60A in the axial direction.

Figure 12:
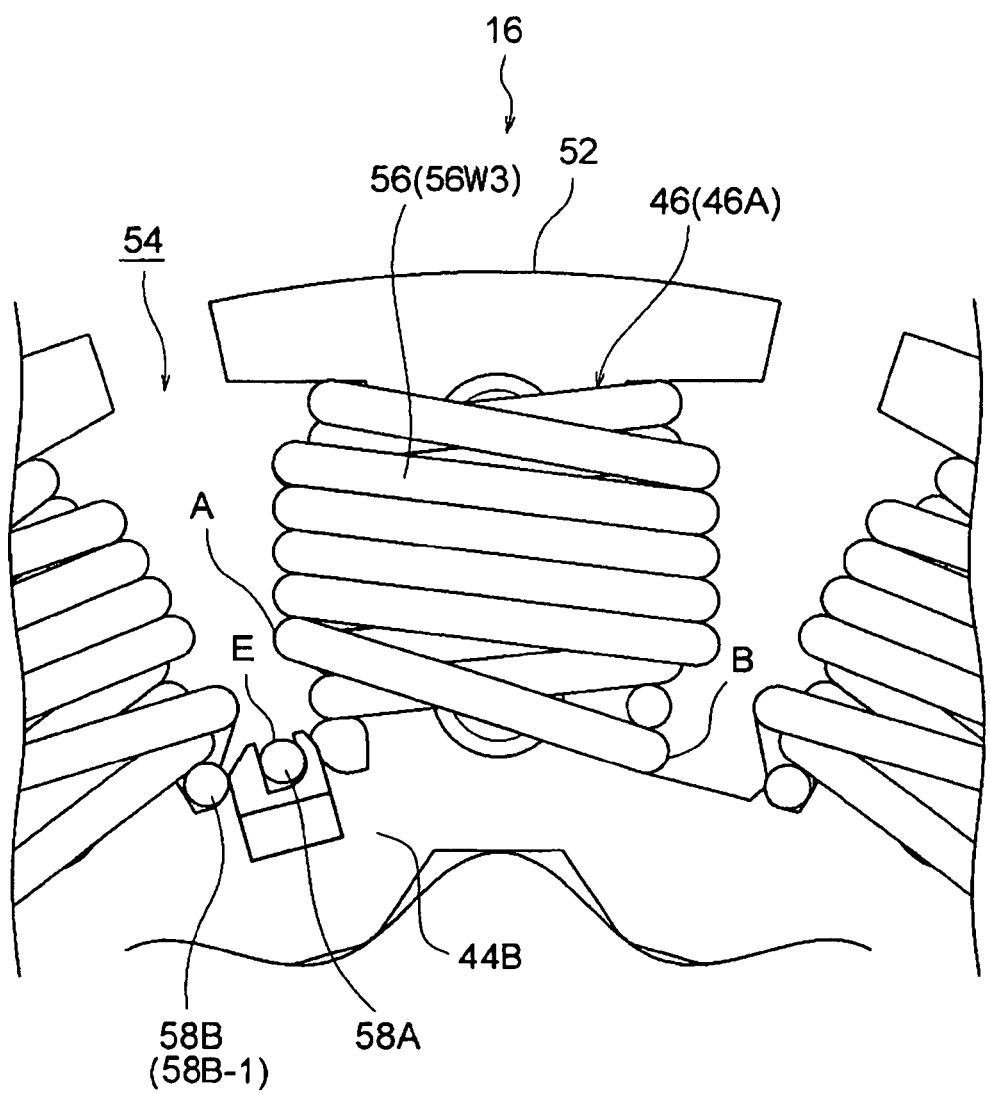
FIG. 12 is an enlarged partial view of the armature core of FIG. 2.
Figure 13:
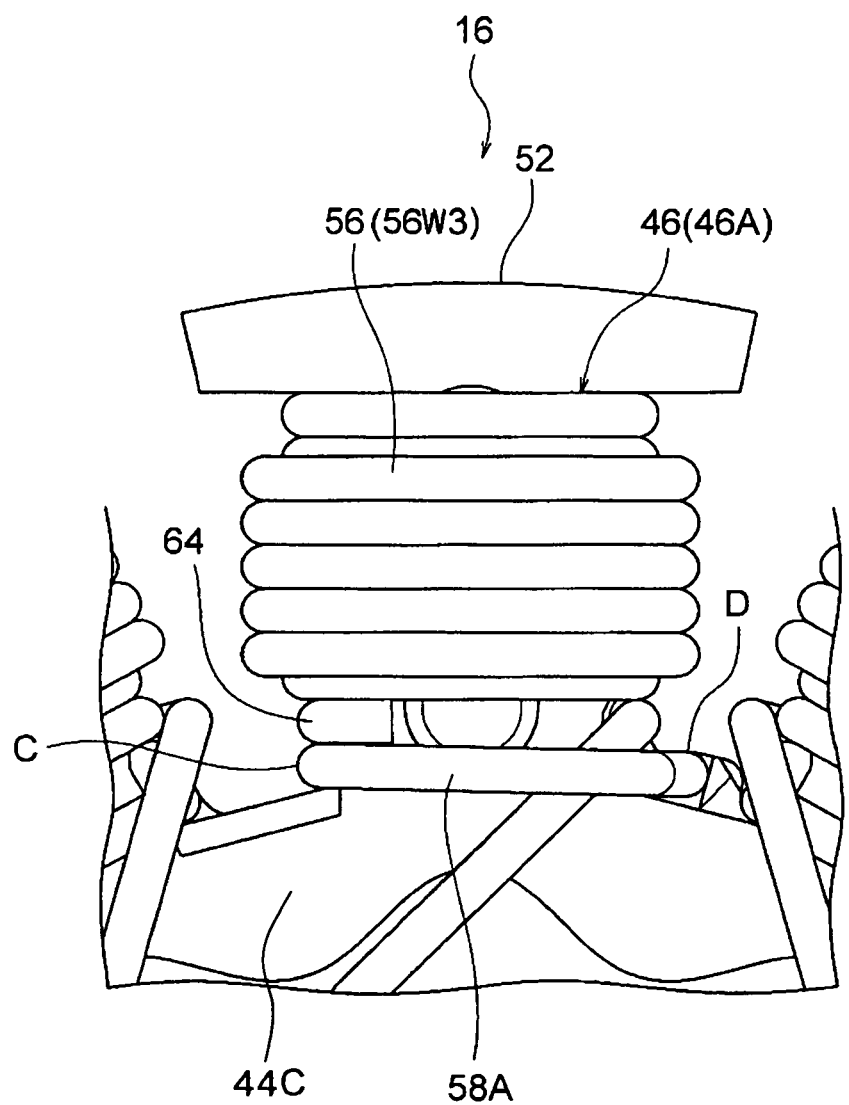
FIG. 13 is an enlarged partial view of the stator of FIG. 12 taken from the other axial side.

As shown in FIG. 13, the inner layer (the first layer) of the winding wire segment 46A, which forms the coil 56 and is placed inward of the outer layer (the second layer) of the winding wire segment 46A (i.e., placed closer to the center axis of the tooth 52 than the outer layer of the winding wire segment 46A), is wound at a corresponding radial location of the tooth 52 that is placed radially outward of the wire limiter 64 in the radial direction of the armature core 44. The winding end section 58A (the last wound section of the outermost layer of the winding wire segment 46A), which is continuous from the coil 56, is wound at a corresponding radial location of the tooth 52, which is placed radially inward of the wire limiter 64 in the radial direction of the armature core 44. Then, the winding end section 58A is pulled out from the slot 54 on the one axial side of the armature core 44. The winding end section 58A is wound around the tooth 52 in a sequence of A, B, C, D and E shown in FIGS. 12 and 13.

Figure 14A:
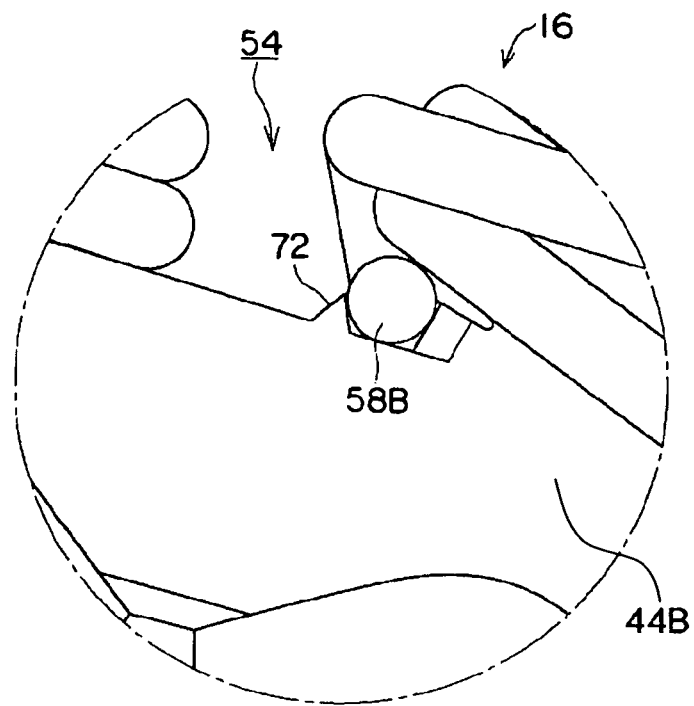
FIGS. 14A and 14B are partial enlarged views of the stator shown in FIG. 1.
Figure 14B:
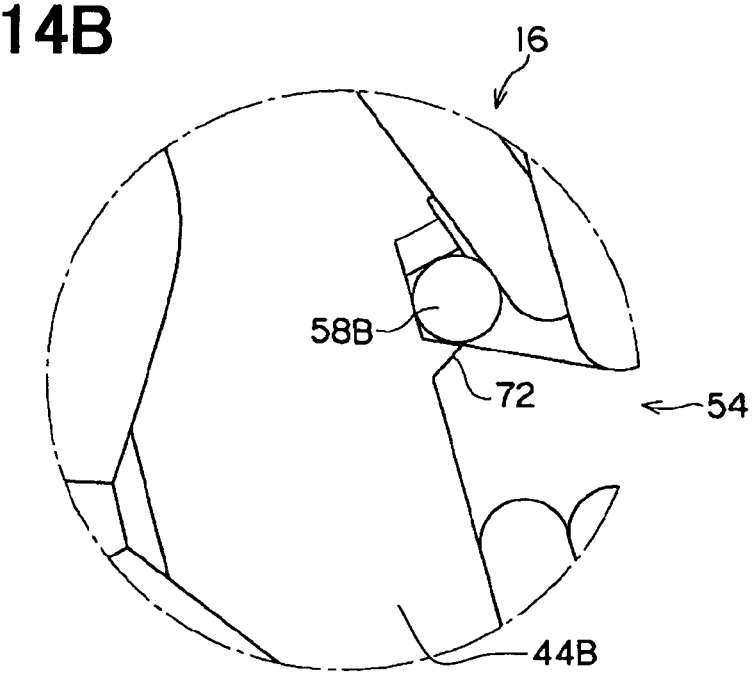

As shown in FIGS. 14A and 14B, at the slot 54, in which the wire guide 60A is not formed, the winding start section 58B may possibly be slid in the circumferential direction due to the absence of the clamping pieces 62A, 62B. Thereby, in the present embodiment, a projection 72 is formed in the insulator segment 44B to radially outwardly project from the radially inner bottom portion of the slot 54 at a location adjacent to the winding start section 58B. The projection 72 limits the slide movement of the winding start section 58B.

Figure 15:
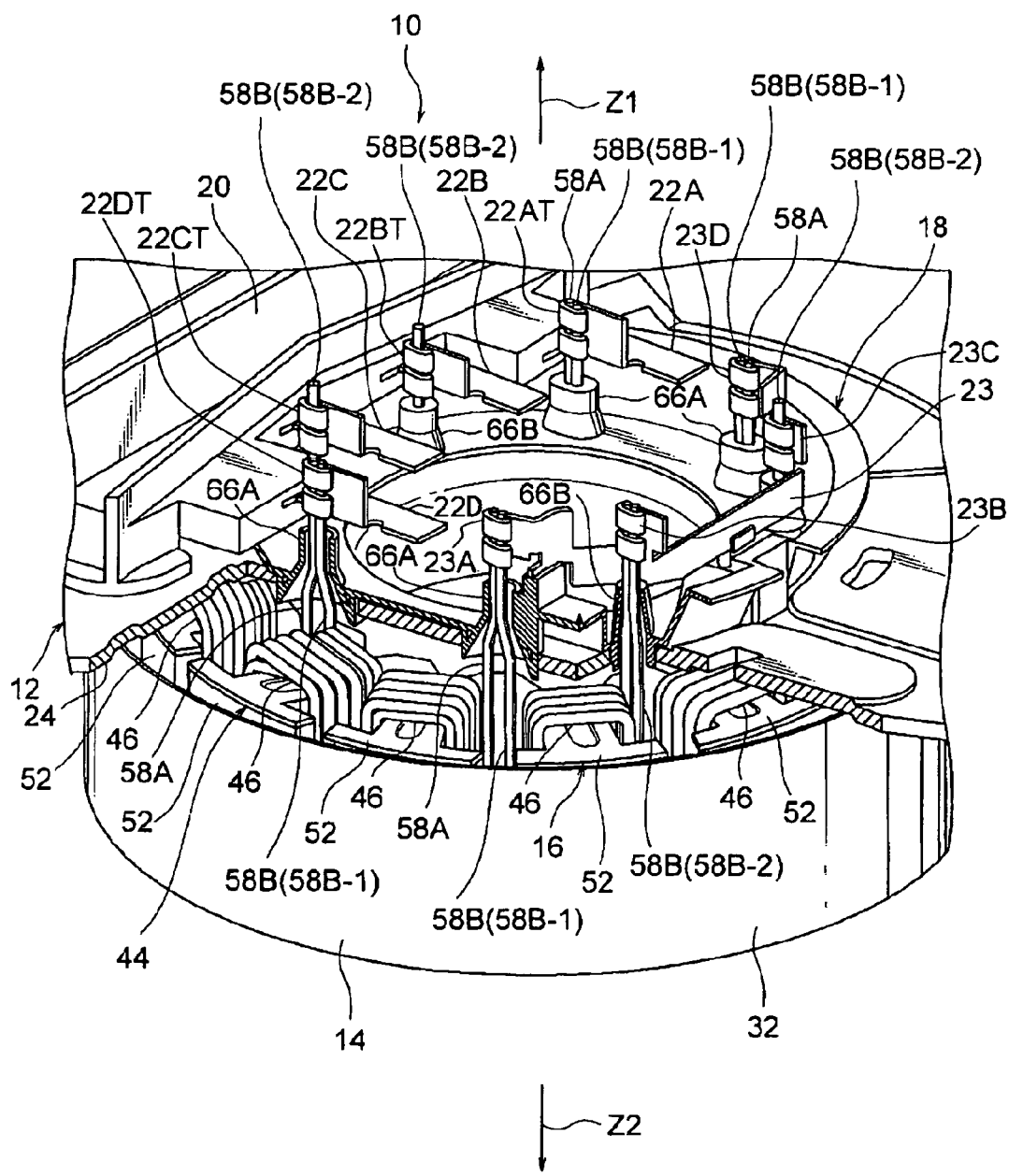
FIG. 15 is a partial fragmented perspective view of the motor of FIG. 1.

As shown in FIG. 15, the holding member 18 is placed on the one axial side (Z1 side) of the centerpiece 12 and is supported by the main body 24 of the centerpiece 12. The holding member 18 is made of a dielectric resin material and includes wire holding portions 66A and wire holding portions 66B.

Each of the wire holding portions 66A is placed on the one axial side (Z1 side) of the armature core 44 and is generally axially aligned with, i.e., is generally axially opposed to the corresponding wire guide 60A and the corresponding wire guide 60B1 (see FIG. 2). In contrast, each of the wire holding portions 66B is placed on the one axial side (Z1) of the armature core 44 and is generally axially aligned with, i.e., is generally axially opposed to the corresponding wire guide 60B-2 (see FIG. 2).

Figure 17:
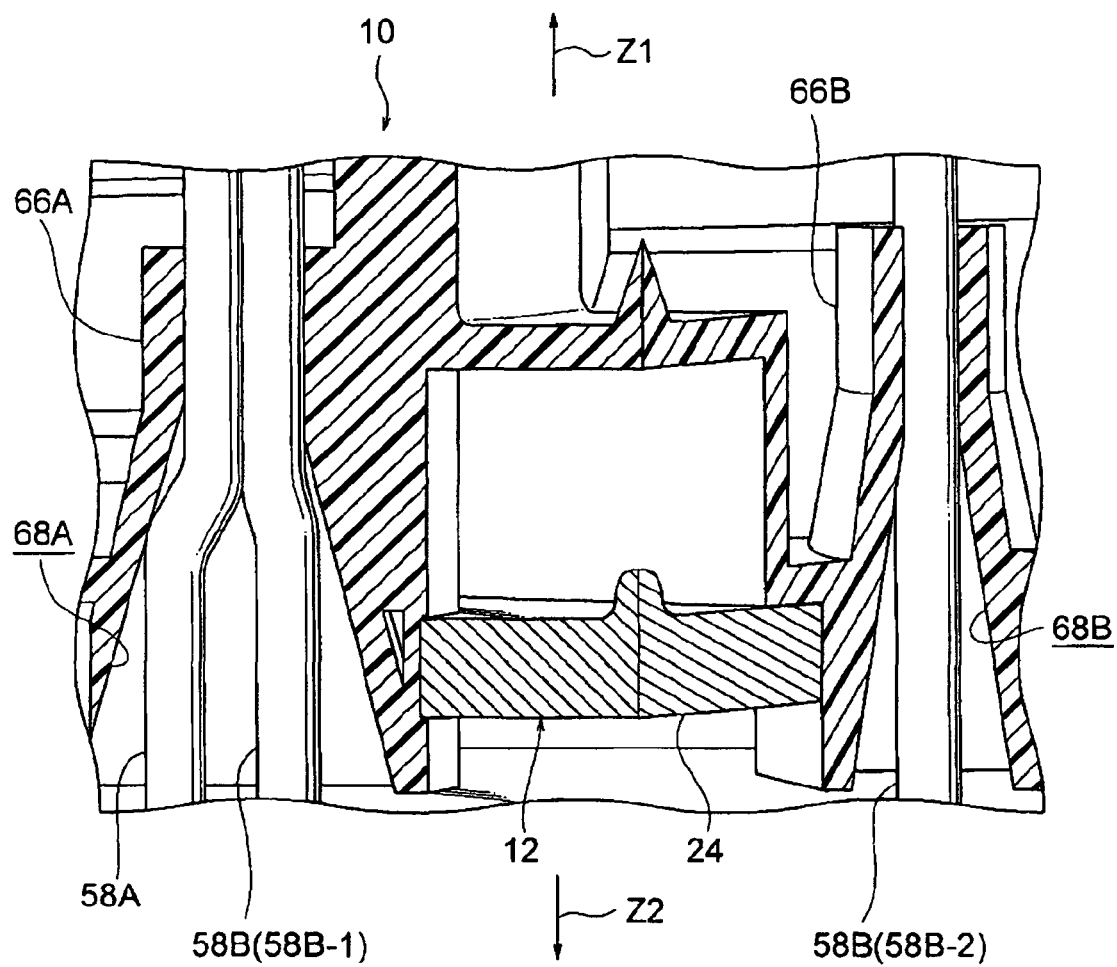
FIG. 17 is an enlarged partial view of FIG. 15.

As shown in FIG. 17, each wire holding portion 66A includes a receiving hole 68A, which axially extends through the wire holding portion 66A, and each wire holding portion 66B includes a receiving hole 68B, which axially extends through the wire holding portion 66B. At a proximal end portion of the receiving hole 68A, the receiving hole 68A is tapered such that an inner diameter of the receiving hole 68A progressively increases toward the other axial side (Z2 side) where the wire guide 60A is located. Similarly, at a proximal end portion of the receiving hole 68B, the receiving hole 68B is tapered such that an inner diameter of the receiving hole 68B progressively increases toward the other axial side (Z2 side) where the wire guide 60B is located. These receiving holes 68A, 68B may be progressively tapered along the entire length thereof, if desired.

The receiving hole 68A receives the winding end section 58A and the winding start section 58B (58B-1). The receiving hole 68B receives the winding start section 58B (58B-2). In this way, as shown in FIG. 15, the winding end section 58A and the winding start section 58B (58B-1), which are guided by the wire guide 60A, are held in such a state that the winding end section 58A and the winding start section 58B (58B-1) are guided to the one axial side (Z1 side) of the armature core 44 by the wire holding portion 66A. Similarly, the winding start section 58B (58B-2), which is guided by the wire guide 60B, is held in such a state that the winding start section 58B (58B-2) is guided to the one axial side of the armature core 44 by the wire holding portion 66B.

Figure 5:
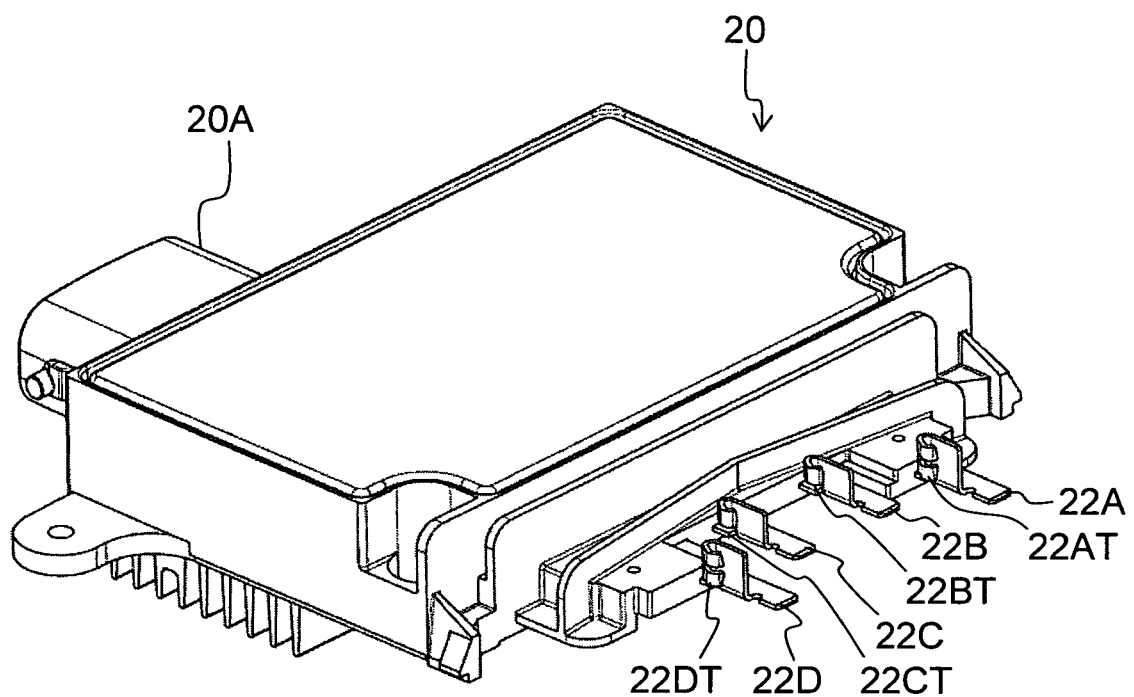
FIG. 5 is a perspective view showing a circuit apparatus of the electric motor of FIG. 1.
Figure 6:
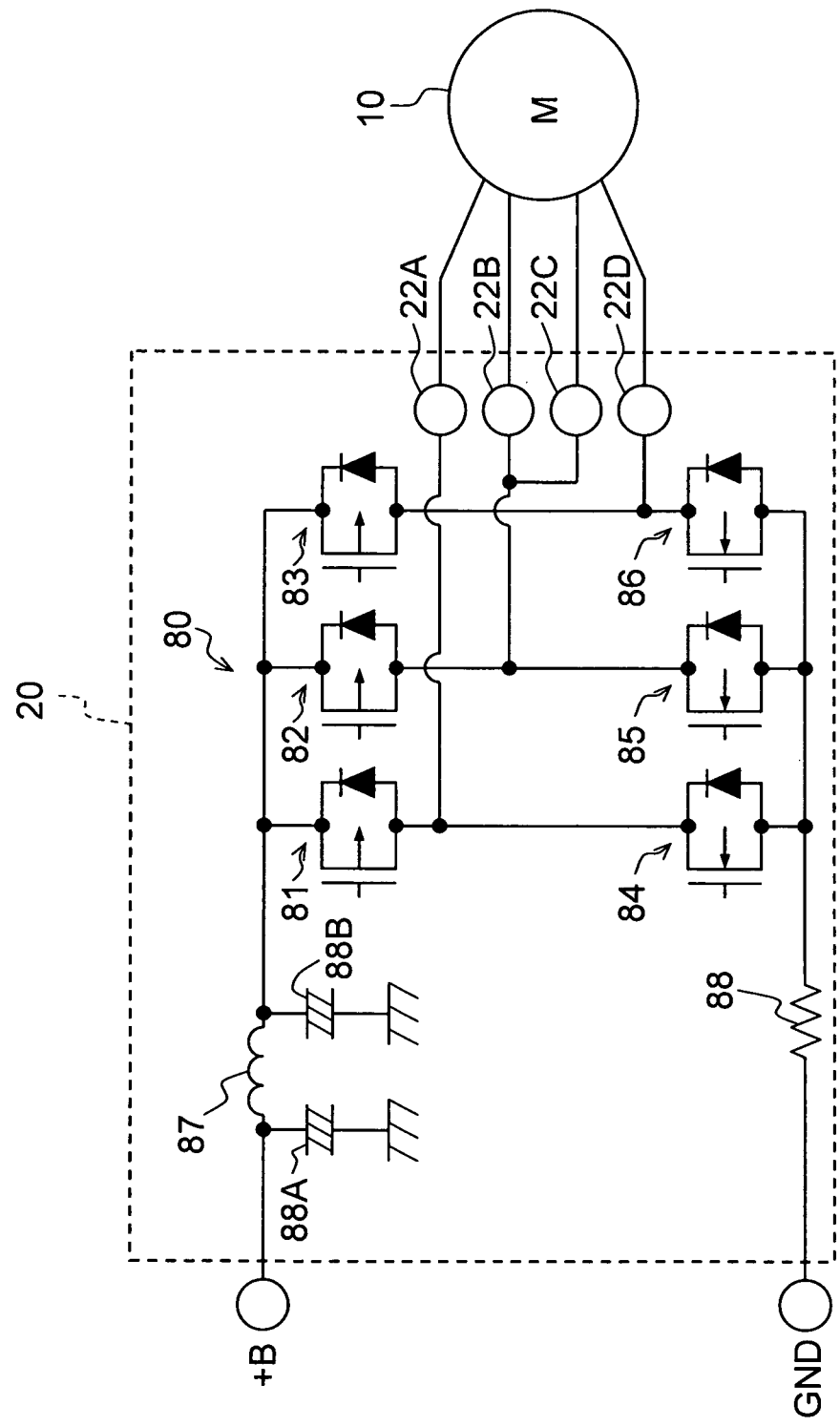
FIG. 6 is a schematic circuit diagram showing a circuit structure of the circuit apparatus of FIG. 1.

With reference to FIGS. 1 and 4-6, the circuit apparatus 20 is placed on the one axial side (Z1 side) of the centerpiece 12 and is supported by the centerpiece 12. Furthermore, power supply terminal elements 22A-22D of the circuit apparatus 20 are placed on the one axial side of the armature core 44 where the wire holding portions 66A, 66B are located. The circuit apparatus 20 includes an inverter 80 (see FIG. 6) of a known type that has a plurality (six in this instance) of metal oxide semiconductor field effect transistors (MOSFETs) 81-86, which serve as switching devices. The inverter 80 is powered from an electric power source (e.g., a vehicle battery)+B through a reactor 87 via a connector 20A (FIG. 5). Smoothing capacitors 88A, 88B are connected to the opposed ends of the reactor 87. Furthermore, the inverter 80 is grounded to a ground GND through a resistor 88 via the connector 20A. In addition, although not depicted, the circuit apparatus 20 includes a pre-driver, which generates a PWM signal supplied to gates of the MOSFETs 81-86.

The power supply terminal elements 22A-22D electrically connect the MOSFETs 81-86 of the circuit apparatus 20 to the winding end sections 58A and the winding start sections 58B. More specifically, with reference to FIGS. 4 to 6 and 15, the winding start section 58B-1, which is continuous with the coil 56W4, and the winding end section 58A, which is continuous with the coil 56W3, are electrically connected to and are held by a connection 22AT of the power supply terminal element 22A, which is connected to a connection between a source of the MOSFET 81 and a drain of the MOSFET 84. The winding start section 58B-2, which is continuous with the coil 56U3, is electrically connected to and held by a connection 22BT of the power supply terminal element 22B, which is connected to a connection between a source of the MOSFET 82 and a drain of the MOSFET 85. The winding start section 58B-2, which is continuous with the coil 56U4, is electrically connected to and held by a connection 22CT of the power supply terminal element 22C, which is connected to the connection between the source of the MOSFET 82 and the drain of the MOSFET 85. The winding start section 58B-1, which is continuous with the coil 56V2, and the winding end section 58A, which is continuous with the coil 56V1, are electrically connected to and are held by a connection 22DT of the power supply terminal element 22D, which is connected to a connection between a source of the MOSFET 83 and a drain of the MOSFET 86.

The other remaining winding start sections 56B-1, 56B-2 and winding end sections 56A are electrically connected together through a neutral point terminal 23. More specifically, the winding start section 58B-1, which is continuous with the coil 56W1, and the winding end section 58A, which is continuous with the coil 56W2, are electrically connected to and are held by a connection 23A of the neutral point terminal 23. The winding end section 58A, which is continuous with the coil 56U2, is electrically connected to and held by a connection 23B of the neutral point terminal 23. The winding end section 58A, which is continuous with the coil 56U1, is electrically connected to and held by a connection 23C of the neutral point terminal 23. The winding start section 58B-1, which is continuous with the coil 56V3, and the winding end section 58A, which is continuous with the coil 56V4, are electrically connected to and are held by a connection 23D of the neutral point terminal 23.

At the time of assembling operation of the electric motor 10, upon the installation of the armature core 44, which has the winding wires 46 wound around the teeth 52, to the motor shaft 30, the centerpiece 12 is fitted over the armature core 44.

Thereafter, the holding member 18 is fitted to the centerpiece 12. At this time, as shown in FIG. 16, axial lower end parts of the wire holding portions 66A of the holding member 18 are fitted into corresponding receiving holes 12A of the centerpiece 12, and axial lower end parts of the wire holding portions 66B of the holding member 18 are fitted into corresponding receiving holes 12B of the centerpiece 12. Also, a fitting element 18A of the holding member 18 is snap fitted to a corresponding receiving hole 12C of the centerpiece 12. Thereafter, the connections 22AT, 22BT, 22CT, 22DT of the power supply terminal elements 22A, 22B, 22C, 22D are placed over and electrically fused to protruding end parts of the corresponding ones of the winding start sections 58B-1, 58B-2 and the winding end sections 58A, which protrude from the corresponding wire holding portions 66A, 66B of the holding member 18. The electrical fusing of the connections 22AT, 22BT, 22CT, 22DT of the power supply terminal elements 22A, 22B, 22C, 22D to the protruding end parts of the corresponding ones of the winding start sections 58B-1, 58B-2 and the winding end sections 58A is executed in a conventional manner using a fusing electrode while the connections 22AT, 22BT, 22CT, 22DT of the power supply terminal elements 22A, 22B, 22C, 22D are urged against the protruding end parts of the corresponding ones of the winding start sections 58B-1, 58B-2 and the winding end sections 58A. Similarly, the connections 23A, 23B, 23C, 23D of the neutral point terminal 23 are connected to the protruding end parts of the corresponding ones of the winding start sections 58B-1, 58B-2 and the winding end sections 58A by the electrical fusing.

Next, advantages of the present embodiment will be described.

In the case of the motor 10 of the present embodiment, the power supply terminal elements 22A-22D of the circuit apparatus 20 are placed on the one axial side (Z1 side) of the armature core 44 where the wire holding portions 66A, 66B are located, and each corresponding one of the winding start sections 58B and the winding end sections 58A is directly connected to the corresponding one of the power supply terminal elements 22A-22D without using the intermediate terminal or the like. Therefore, unlike the prior art technique, the intermediate terminals are not required, so that it is possible to reduce the costs.

In the case where each corresponding one of the winding start sections 58B and the winding end sections 58A is directly connected to the corresponding one of the power supply terminal elements 22A-22D without using the intermediate terminal or the like, it is necessary to reliably guide each corresponding one of the winding start sections 58B and the winding end sections 58A to the corresponding one of the power supply terminal elements 22A-22D in order to achieve the good work efficiency at the time of connecting each corresponding one of the winding start sections 58B and the winding end sections 58A to the corresponding one of the power supply terminal elements 22A-22D, or in order to maintain the good connection state of each corresponding one of the winding start sections 58B and the winding end sections 58A to the corresponding one of the power supply terminal elements 22A-22D.

With respect to this point, in the case of the motor 10 of the present embodiment, each corresponding one of the winding start sections 58B and the winding end sections 58A is guided to the corresponding one of the power supply terminal elements 22A-22D by the corresponding one of the winding holding portions 66A, 66B. Therefore, each corresponding one of the winding start sections 58B and the winding end sections 58A can be reliably guided to the corresponding one of the power supply terminal elements 22A-22D. Thus, the good work efficiency can be achieved at the time of connecting each corresponding one of the winding start sections 58B and the winding end sections 58A to the corresponding one of the power supply terminal elements 22A-22D, and the good connection state of each corresponding one of the winding start sections 58B and the winding end sections 58A to the corresponding one of the power supply terminal elements 22A-22D can be maintained.

Furthermore, the wire guides 66A, 66B, which guide the winding start sections 58B and the winding end sections 58A to the wire holding portions 66A, 66B, are formed in the radially inner bottom portions of the slots 54. Therefore, at the time of installing the holding member 18 to the centerpiece 12, the winding start sections 58B and the winding end sections 58A can be guided to the wire holding portions 66A, 66B by the wire guides 60A, 60B. Therefore, the work efficiency at the time of installing the holding member 18 can be improved.

Furthermore, each winding end section 58A is wound at the corresponding radial location of the tooth 52, which is placed radially inward of the wire limiter 64 in the radial direction of the armature core 44. Therefore, the winding end section 58A can be placed closer to the wire guide 60A. In this way, it is possible to limit the occurrence of the spring back of the winding end section 58A, which is guided by the wire guide 60A. As a result, it is possible to limit the unintentional removal of the winding end section 58A form the wire guide 60A.

Figure 18:
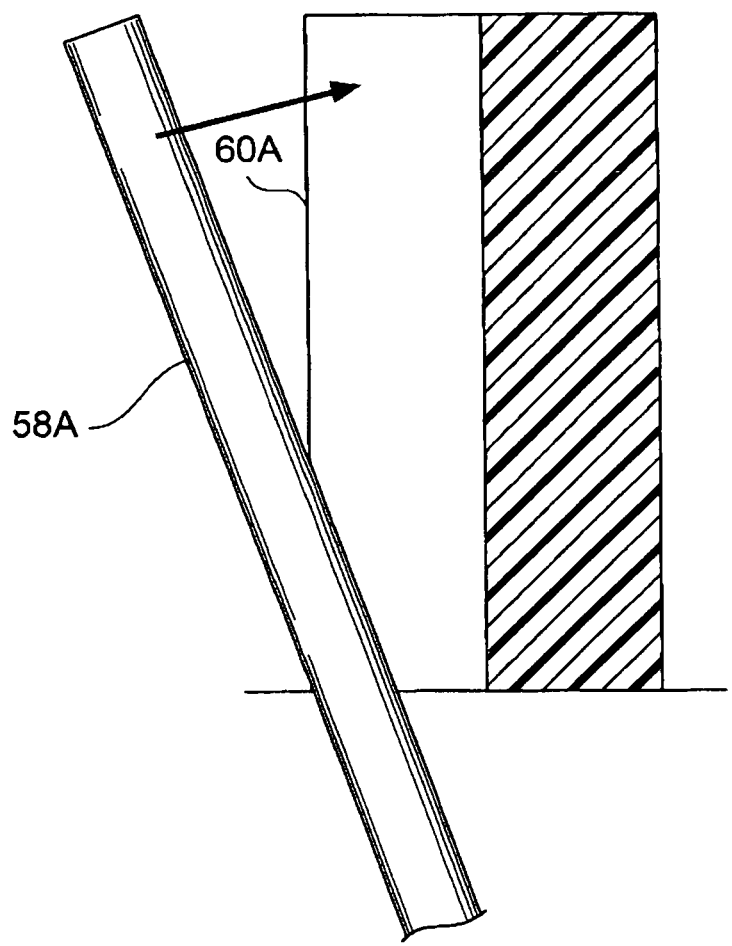
FIG. 18 is a schematic diagram showing insertion of a winding end section of a winding wire into a wire guide shown in FIG. 2.
Figure 20:
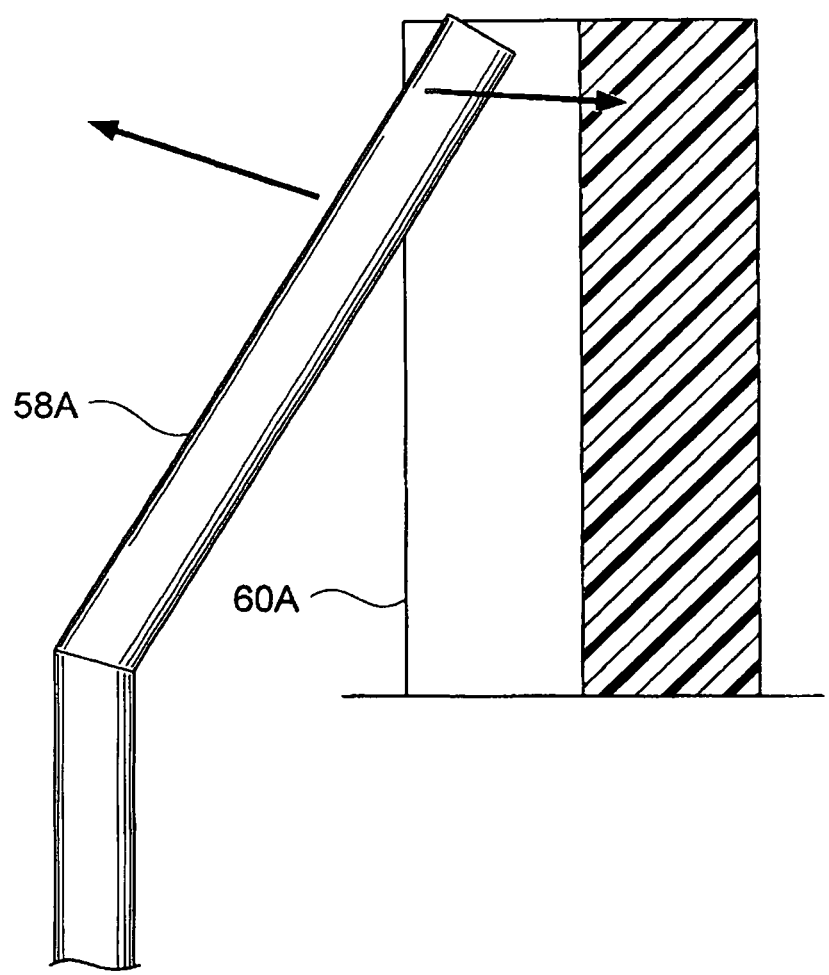
FIG. 20 is a schematic diagram showing insertion of a winding end section of a winding wire into a wire guide in a case of a comparative example.

Specifically, with reference to FIG. 20, which shows a comparative example, in the case where the winding end section 58A is inserted into the wire guide 60A from a remote location that is remote from the wire guide 60A, occurrence of the spring back of the winding end section 58A may be increased. However, in the case of the motor 10 of the present embodiment, as shown in FIG. 18, the winding end section 58A is inserted into the wire guide 60A from a close location, which is close to the wire guide 60A, so that it is possible to limit the occurrence of the spring back of the winding end section 58A.

Furthermore, the clamping pieces 62A, 62B of the wire guide 60A can clamp the winding end section 58A. Therefore, it is possible to further limit the unintentional removal of the winding end section 58A from the wire guide 60A.

Also, the clamping piece 62A is placed on the opposite circumferential side of the clamping piece 62B, which is opposite from the winding end section 58B in the circumferential direction. Therefore, at the time of installing the winding end section 58A to the clamping pieces 62A, 62B of the wire guide 60A, it is possible to limit the interference of the clamping piece 62A, which is formed as the resiliently deformable piece, with the winding start section 58B.

The receiving hole 68A of the wire holding portion 66A is tapered such that the inner diameter of the receiving hole 68A progressively increases toward the other axial side (Z2 side) where the wire guide 60A is located. Similarly, the receiving hole 68B of the wire holding portion 66B is tapered such that an inner diameter of the receiving hole 68B progressively increases toward the other axial side (Z2 side) wherein the wire guide 60B is located. Therefore, at the time of installing the holding member 18 to the centerpiece 12, the winding end sections 58A and the winding start sections 58B can be easily installed into the receiving holes 68A, 68B.

Figure 19:
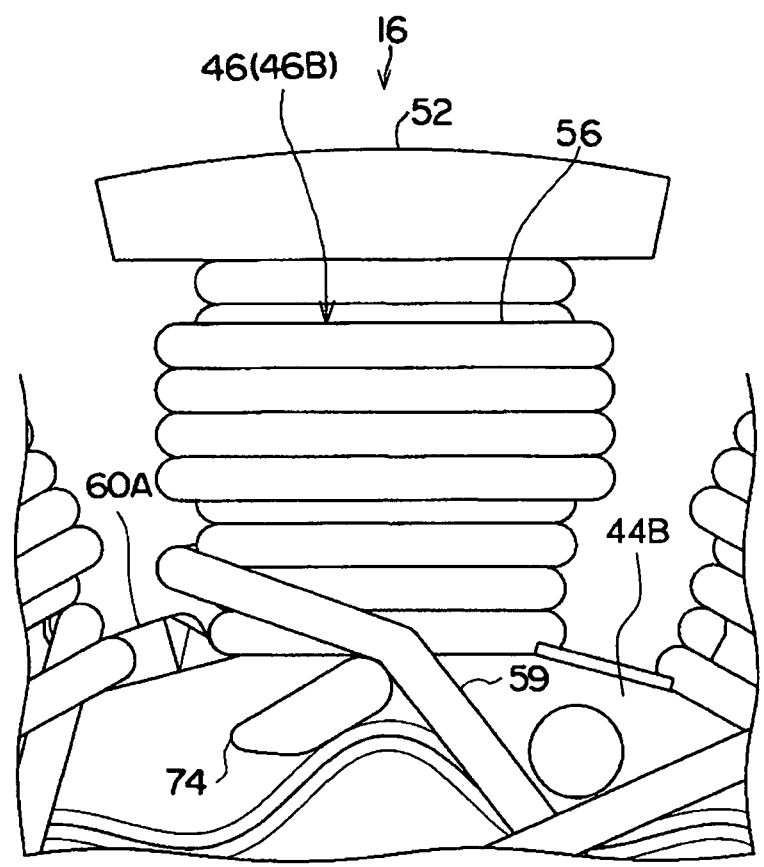
FIG. 19 is an enlarged partial plan view showing a modification of the stator of FIG. 1.

The above embodiment may be further modified as follows. With reference to FIG. 19, when the outermost layer (the second layer) of the winding wire segment 46B, which forms the coil 56, is moved toward the radially inner end of the tooth 52, an end part (i.e., a bridge line segment 59 side end part) of the outermost layer of the winding wire segment 46B, which forms the coil 56, may possibly interfere with the wire guide 60A. Therefore, in the modification shown in FIG. 19, a projection 74 is formed in the insulator segment 44B to axially project at the stator 16. The projection 74 changes or limits the path of the bridge line segment 59 to prevent the interference of the bridge line segment 59 side end part of the outermost layer of the winding wire segment 46B, which forms the coil 56, with the wire guide 60A.

The embodiment of the present invention has been described above. However, the present invention is not limited to the above embodiment, and the above embodiment may be modified in various ways without departing from the spirit and scope of the present invention.

What is claimed is:

1. An electric motor comprising:
   an armature core that includes:
      an annular portion, which is configured into an annular form; and
      a plurality of teeth, which extend radially outward from the annular portion in a radial direction of the annular portion and are arranged one after another in a circumferential direction of the annular portion to define a plurality of slots, each of which is defined between corresponding circumferentially adjacent two of the plurality of teeth;
   a plurality of winding wires, each of which is wound in a plurality of layers around each corresponding one of the plurality of teeth to form a coil around the corresponding tooth and is guided out from a corresponding one of the plurality of slots on one axial side of the armature core to form a winding terminal section of the winding wire, which is continuous with the coil of the winding wire;
   a plurality of wire guides, each of which is provided at a radial bottom portion of a corresponding one of the plurality of slots and guides the winding terminal section of a corresponding one of the plurality of winding wires toward the one axial side of the armature core;
   a plurality of wire holding portions, each of which is formed separately from the plurality of wire guides and is placed on the one axial side of the armature core at a corresponding location that is located on one axial side of a corresponding one of the plurality of wire guides, which is opposite from the armature core, and is generally aligned with the corresponding one of the plurality of wire guides along an axial direction of the armature core, wherein each of the plurality of wire holding portions holds the winding terminal section of the corresponding one of the plurality of winding wires guided by the corresponding one of the plurality of wire guides; and
   a circuit apparatus that is placed on the one axial side of the armature core and supplies an electric current to the plurality of winding wires, wherein the circuit apparatus includes a plurality of power supply terminal elements, each of which is electrically connected to the winding terminal section of a corresponding one of the plurality of winding wires axially protruded out from a corresponding one of the plurality of wire holding portions on one axial side of the corresponding wire holding portion that is opposite from the armature core, wherein
   each of the plurality of winding wires includes:
      a first winding wire segment that is wound around the corresponding one of the plurality of teeth to form the corresponding coil, wherein the winding terminal section of the first winding wire segment is a winding end section that is continuous with the coil of the first winding wire section; and
      a second winding wire segment that is wound around the corresponding one of the plurality of teeth to form the corresponding coil, wherein the winding terminal section of the second winding wire segment is a winding start section that is continuous with the coil of the second winding wire segment;
   a wire limiter is formed at a corresponding one of the plurality of teeth, around which the first winding wire segment is wound, at a corresponding location of the tooth that is spaced from the radial bottom portion of the corresponding slot toward a radial distal end of the corresponding tooth;
   an inner layer of the plurality of layers of the coil of the first winding wire segment, which is placed on an inner side of an outermost layer of the plurality of layers of the coil of the first winding wire segment around the corresponding tooth, is wound at a corresponding radial location of the corresponding tooth that is located on one radial side of the wire limiter where the radial distal end of the corresponding tooth is located; and
   the winding end section of the first winding wire segment is guided out of the corresponding slot on the one axial side of the armature core after being wound around the corresponding tooth at a corresponding radial location of the corresponding tooth, which is located on the other radial side of the wire limiter where a radial proximal end of the corresponding tooth is located.

2. The electric motor according to claim 1, wherein a corresponding one of the plurality of wire guides, which guides the winding end section of the first winding wire segment, includes first and second clamping pieces, which clamp the winding end section of the first winding wire.

3. The electric motor according to claim 2, wherein:
   the winding end section of the first winding wire segment is pulled out from the corresponding slot together with the winding start section of the second winding wire segment of an adjacent one of the plurality of teeth that is adjacent to the tooth, around which the first winding wire segment is wound; and
   the first clamping piece of the corresponding wire guide is formed as a resiliently deformable piece and is placed on an opposite side of the second clamping piece, which is opposite from the winding start section of the second winding wire segment in the circumferential direction.

4. The electric motor according to claim 1, wherein:
each of the plurality of wire holding portions has a receiving hole, which extends through the wire holding portion in the axial direction of the armature core and receives the corresponding winding terminal section through the receiving hole; and
at least an axial proximal end portion of the receiving hole of each of the plurality of wire holding portions, which is located on an axial side where the corresponding wire guide is located, is tapered such that an inner diameter of the receiving hole is progressively increased toward the corresponding wire guide.

5. The electric motor according to claim 1, wherein:
the armature core includes:
an iron core that forms the annular portion and the plurality of teeth; and
an insulator that is made of a dielectric resin material and covers the iron core to electrically insulate the plurality of winding wires from the iron core; and
the insulator includes the plurality of wire guides formed integrally in the insulator.

6. The electric motor according to claim 5, wherein the plurality of wire holding portions is formed integrally in a holding member, which is made of a dielectric resin material and is placed on the one axial side of the armature core.

\* \* \* \* \*